United States Patent
Hutchings et al.

(10) Patent No.: US 11,912,307 B2
(45) Date of Patent: Feb. 27, 2024

(54) MONITORING HEAD MOVEMENTS OF DRIVERS TASKED WITH MONITORING A VEHICLE OPERATING IN AN AUTONOMOUS DRIVING MODE

(71) Applicant: WAYMO LLC, Mountain View, CA (US)

(72) Inventors: Keith Hutchings, San Francisco, CA (US); Ilmo van der Lowe, Fremont, CA (US); Vasily Starostenko, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 469 days.

(21) Appl. No.: 16/929,482

(22) Filed: Jul. 15, 2020

(65) Prior Publication Data

US 2021/0291869 A1    Sep. 23, 2021

Related U.S. Application Data

(60) Provisional application No. 62/991,188, filed on Mar. 18, 2020.

(51) Int. Cl.
*B60W 60/00*      (2020.01)
*B60W 40/08*      (2012.01)

(52) U.S. Cl.
CPC ........ *B60W 60/0025* (2020.02); *B60W 40/08* (2013.01); *B60W 2420/403* (2013.01); *B60W 2540/223* (2020.02); *B60W 2540/225* (2020.02)

(58) Field of Classification Search
CPC ............ B60W 60/0025; B60W 40/08; B60W 2420/42; B60W 2540/223; B60W 2540/225; B60W 2540/229
See application file for complete search history.

(56) References Cited

U.S. PATENT DOCUMENTS 9,690,292 B1    6/2017    Chan et al.
9,725,036 B1    8/2017    Tarte
(Continued)

FOREIGN PATENT DOCUMENTS

DE    102015211126 A1 *   12/2016
JP    2018063489 A        4/2018
(Continued)

OTHER PUBLICATIONS

English Translation: Brunner, DE 102015211126 A1, Dec. 2016, German Patent Office Patent Application Publication (Year: 2016).*

(Continued)

*Primary Examiner* — Nadeem Odeh
(74) *Attorney, Agent, or Firm* — Botos Churchill IP Law

(57) ABSTRACT

Aspects of the disclosure relate to analyzing head movements in a test driver tasked with monitoring the driving of a vehicle operating in an autonomous driving mode. For instance, a sensor may be used to capture sensor data of a test driver's head for a period of time. The sensor data may be analyzed to determine whether the test driver's head moved sufficiently enough to suggest that the test driver is engaged in monitoring the driving of the vehicle. Based on the determination of whether the test driver's head moved sufficiently enough, an intervention response may be initiated.

20 Claims, 9 Drawing Sheets

(56) References Cited

U.S. PATENT DOCUMENTS

| | | | |
|---|---|---|---|
| 9,904,287 B1* | 2/2018 | Kuffner, Jr. | G05D 1/0061 |
| 10,332,292 B1 | 6/2019 | Arnicar | |
| 2011/0241862 A1* | 10/2011 | Debouk | B60W 60/0018 |
| | | | 340/439 |
| 2014/0300479 A1* | 10/2014 | Wolter | B60W 50/14 |
| | | | 340/576 |
| 2015/0015400 A1* | 1/2015 | Davis | G08B 21/06 |
| | | | 340/575 |
| 2016/0214618 A1* | 7/2016 | Wulf | B60Q 9/00 |
| 2016/0355190 A1* | 12/2016 | Omi | B60W 30/12 |
| 2016/0370801 A1* | 12/2016 | Fairfield | G05D 1/0038 |
| 2017/0106892 A1 | 4/2017 | Lisseman et al. | |
| 2018/0001893 A1* | 1/2018 | Wei | G08G 1/167 |
| 2018/0319407 A1* | 11/2018 | Lisseman | B60W 50/14 |
| 2018/0319408 A1* | 11/2018 | Hoetzer | G05D 1/0061 |
| 2018/0326995 A1* | 11/2018 | Hiramatsu | G08G 1/16 |
| 2019/0092337 A1 | 3/2019 | Chua et al. | |
| 2019/0225228 A1* | 7/2019 | Gurusubramanian | |
| | | | G06V 20/597 |
| 2019/0248374 A1* | 8/2019 | Aizawa | B60K 28/06 |
| 2019/0263262 A1* | 8/2019 | Mimura | B60W 10/20 |
| 2020/0004244 A1* | 1/2020 | Mangal | G05D 1/0088 |
| 2020/0183383 A1* | 6/2020 | Stent | G06F 3/013 |
| 2020/0198644 A1 | 6/2020 | Hutchings et al. | |
| 2020/0207366 A1* | 7/2020 | Kapuria | G05D 1/0061 |
| 2020/0231165 A1* | 7/2020 | Miura | B60W 60/0051 |
| 2020/0231173 A1* | 7/2020 | Mueller-Tomfelde | |
| | | | G06V 20/597 |
| 2020/0339131 A1* | 10/2020 | Olsson | B60W 50/0205 |
| 2020/0377126 A1* | 12/2020 | Obata | G01C 21/36 |
| 2021/0016804 A1* | 1/2021 | Hara | B60W 60/0057 |
| 2021/0053586 A1* | 2/2021 | Domeyer | G06T 11/00 |
| 2021/0061287 A1* | 3/2021 | Cieslar | B60W 60/0053 |
| 2021/0089120 A1* | 3/2021 | Grimm | B60W 30/18 |
| 2021/0094583 A1* | 4/2021 | Choi | B60W 50/16 |
| 2021/0276581 A1* | 9/2021 | Sekine | B60W 50/12 |

FOREIGN PATENT DOCUMENTS

| | | |
|---|---|---|
| JP | 2019135150 A | 8/2019 |
| KR | 20190105152 A | 9/2019 |
| WO | 2019029195 A1 | 2/2019 |

OTHER PUBLICATIONS

International Search Report and Written Opinion for Application No. PCT/US21/22776 dated Jul. 7, 2021.

* cited by examiner

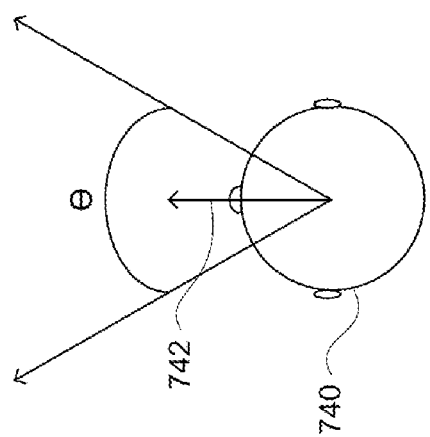
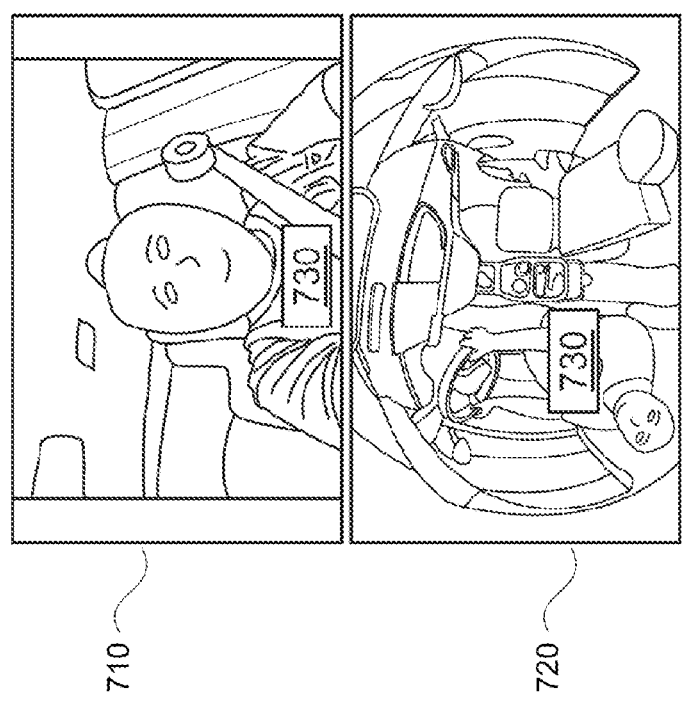
FIGURE 7B
FIGURE 7A

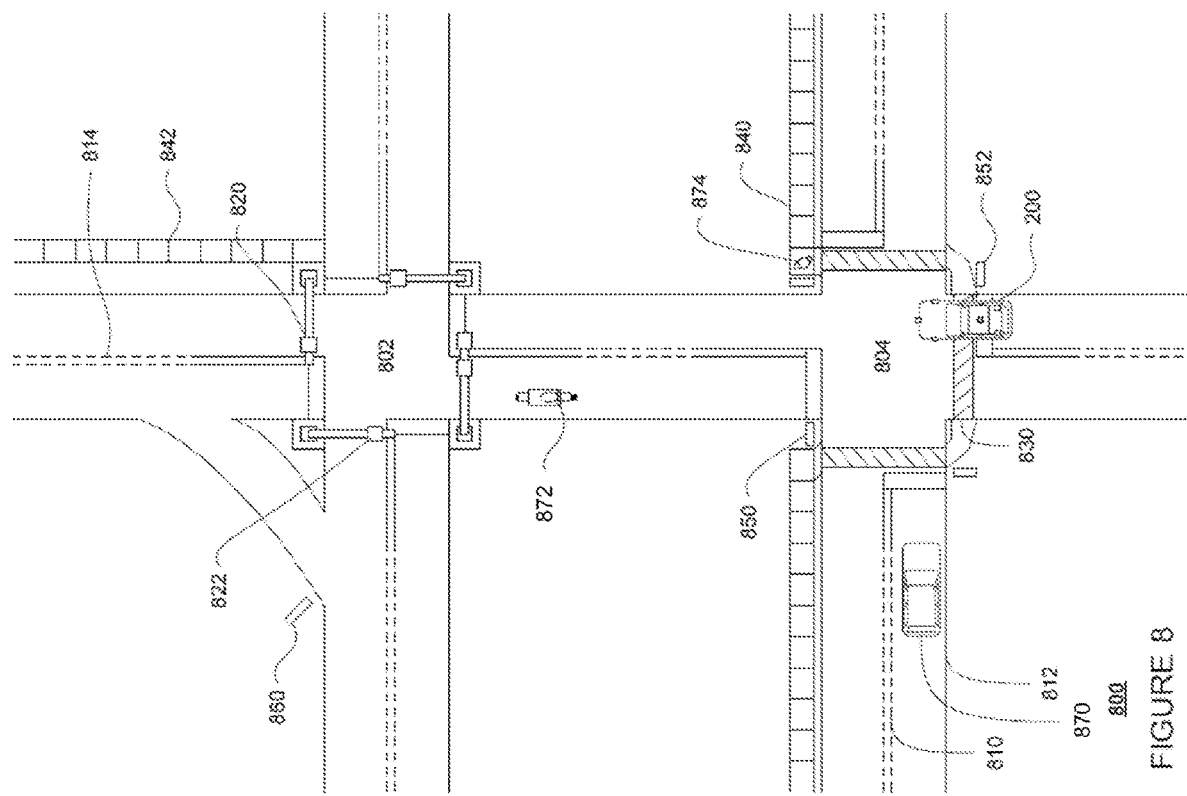

MONITORING HEAD MOVEMENTS OF DRIVERS TASKED WITH MONITORING A VEHICLE OPERATING IN AN AUTONOMOUS DRIVING MODE

CROSS REFERENCE TO RELATED APPLICATIONS

The present application claims the benefit of the filing date of U.S. Provisional Application No. 62/991,188, filed Mar. 18, 2020, the entire disclosure of which is incorporated by reference herein

BACKGROUND

Autonomous vehicles, such as vehicles which do not require a human driver when operating in an autonomous driving mode, may be used to aid in the transport of passengers or items from one location to another. Testing of these vehicles typically involves a "test driver" who is tasked with monitoring the autonomous vehicle to ensure that the vehicle is operating safely. For instance, a person may be expected to monitor the vehicle and the vehicle's environment while the vehicle operates in the autonomous driving mode and to be ready to take control of the vehicle should the vehicle not be responding appropriately. Supervision of such vehicles is known to increase a person's susceptibility to fatigue, whether due to sleep deprivation, poor quality sleep, fatigue induced by the task itself, or the interaction of these contributing sources of fatigue. Furthermore, as the performance of autonomous vehicles improve, fewer interventions are by a human driver, the likelihood of fatigue in human test drivers increases.

SUMMARY

One aspect of the disclosure provides a method of analyzing head movements in a test driver tasked with monitoring the driving of a vehicle operating in an autonomous driving mode. The method includes using, by one or more processors, a sensor to capture sensor data of a test driver's head for a period of time; analyzing, by the one or more processors, the sensor data to determine whether the test driver's head moved sufficiently enough to suggest that the test driver is engaged in monitoring the driving of the vehicle; and based on the determination of whether the test driver's head moved sufficiently enough, initiating, by the one or more processors, an intervention response.

In one example, the sensor is a camera, and the sensor data is a video captured over the period of time. In this example, analyzing the sensor data includes using a model to determine changes in position of the test driver's head, and the determination of whether the test driver's head moved sufficiently enough is further based on the changes in position of the test driver's head. In another example, analyzing the sensor data includes looking for a particular pattern of movement, and the determination of whether the test driver's head moved sufficiently enough is further based on the particular pattern of movement. In this example, the particular pattern of movement includes whether an expected head vector of the test driver is oriented above a dashboard of the vehicle for a portion of the period of time. In addition or alternatively, the particular pattern of movement includes whether an expected head vector of the test driver is oriented below a dashboard of the vehicle for at least a given amount of time. In addition or alternatively, the particular pattern of movement includes whether a head vector of the test driver was oriented towards one or more mirrors of the vehicle within the period of time. In addition or alternatively, the method also includes identifying an object within pre-stored map information that the test driver is expected to observe, and the particular of movement includes whether the test driver observed the object in an environment of the vehicle during the period of time. In addition or alternatively, the particular pattern of movement relates to whether the vehicle is in motion during the period of time. In addition or alternatively, the particular pattern of movement relates to whether the vehicle is about to begin moving during the period of time. In addition or alternatively, the method also includes receiving information about an object detected in an environment of the vehicle by a perception system of the vehicle, and wherein the particular pattern of movement relates to whether the test driver observed the object. In this example, the test driver is considered to have observed the object when the object is within a range of angles within which the test driver is expected to view given a location of the test driver's head.

In another example, the method also includes receiving information about an object detected in an environment of the vehicle by a perception system of the vehicle, and analyzing the sensor data includes determining an amount of time that the test driver observed the object such that the determination of whether the test driver's head moved sufficiently enough is further based on the amount of time. In another example, the method also includes receiving information about a plurality of objects detected in an environment of the vehicle by a perception system of the vehicle, and wherein analyzing the sensor data includes determining an amount of time that the test driver observed each of the plurality of objects such that the determination of whether the test driver's head moved sufficiently enough is further based on the amounts of time for each of the plurality of objects. In this example, the method also includes comparing the amounts of time for each of the plurality of objects with expected amounts of time, and wherein the determination of whether the test driver's head moved sufficiently enough is further based on the comparison. In this example, the method also includes using a model to determine the expected amounts of time based on a location of the vehicle when the sensor data was captured, pre-stored map information used to control the vehicle, and the received information.

In another example, the method also includes receiving information about a plurality of objects detected in an environment of the vehicle by a perception system of the vehicle. In addition, analyzing the sensor data includes inputting the received information, the sensor data, pre-stored map information used to control the vehicle, and a location of the vehicle when the sensor data was captured into a model in order to determine a value indicative of how closely a test driver's head movements correspond to expected head movements for a test driver, and the determination of whether the test driver's head moved sufficiently enough is further based on the value. In another example, analyzing the sensor data includes inputting the sensor data into a model in order to determine a head movement score for the sensor data, the head movement score corresponds to a magnitude of head movements of the test driver during the period of time, the method further comprises comparing the head movement score to a value, and the determination of whether the test driver's head moved sufficiently enough is further based on the comparison. In this example, the method also includes determining the value based on past history of head movement scores for the test driver. In another example, analyzing the sensor data includes inputting the sensor data into a model in order to determine a head movement score for the sensor data, the head movement score corresponds to a magnitude of the head movements of the test driver during the period of time, and the method further comprises analyzing changes in head movement scores including the head movement score over time, and the determination of whether the test driver's head moved sufficiently enough is further based on the changes.

BRIEF DESCRIPTION OF THE DRAWINGS

FIG. 7A is an example of video of a test driver in accordance with aspects of the disclosure.

FIG. 7B is an example of a head of a test driver in accordance with aspects of the disclosure.

FIG. 8 is an example of a vehicle driving in a geographic area in accordance with aspects of the disclosure.

DETAILED DESCRIPTION

Overview

Figure 1:
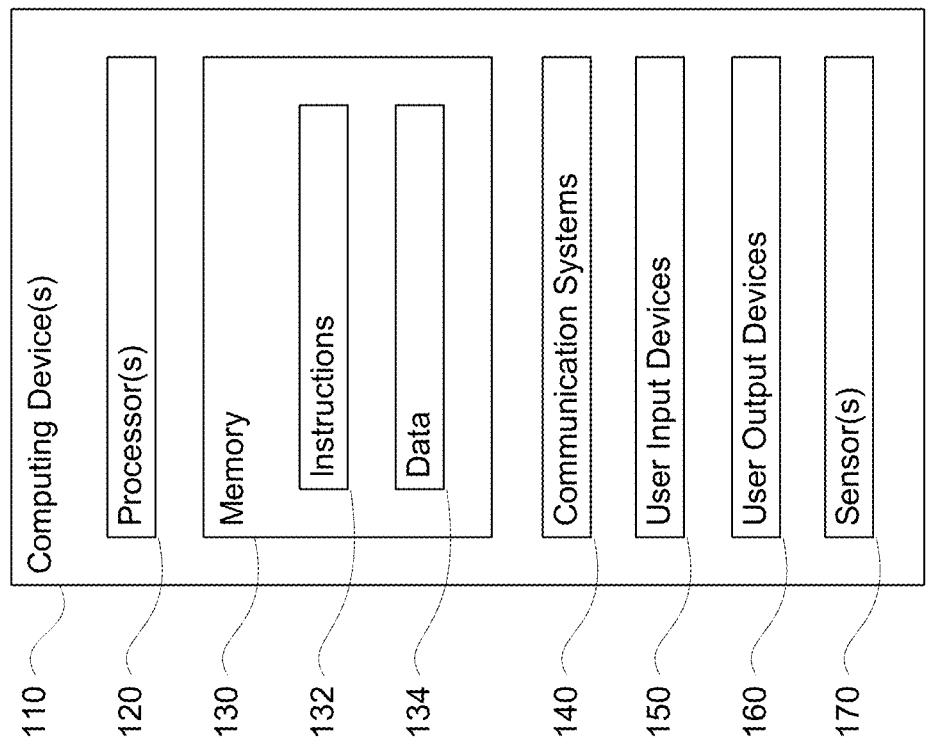
FIG. 1 is an example of a driver monitoring system in accordance with aspects of the disclosure.

The technology relates to preventing fatigue events in persons who are tasked with monitoring the driving of a vehicle operating in an autonomous driving mode. For instance, a person may be expected to monitor the vehicle and the vehicle's environment while the vehicle operates in the autonomous driving mode and be ready to immediately take control of the vehicle should the vehicle not be responding appropriately. Fatigue can result in fatigue events where a person becomes inattentive, closes his or her eyes, or even falls asleep. In other situations, merely being inattentive while monitoring the vehicle can result in a dangerous situation. As such, it is critically important to ensure that autonomous vehicle operators remain attentive and are capable of continuing such monitoring and to intervene if needed.

In many instances, the frequency and magnitude of movement of a test driver's head and/or eye movements may be dependent upon the context in which a vehicle is driving. In this regard, given the driving context, it may be expected that a test driver would have at least some movements, and in some cases, a particular pattern of head and/or gaze changes if the test driver was actively engaged in monitoring the vehicle's driving or rather, that the test driver was situationally aware. Such information may therefore be used as a proxy for determining fatigue in persons tasks with monitoring driving of a vehicle operating in an autonomous driving mode.

The movements of a test driver's head may be captured using a sensor mounted within the vehicle and oriented towards where the test driver is sitting. In some instances, the position, vector, and changes in position/vector can be determined using a simple model of head position relative to an expected position of the test driver's body. The sensor data, e.g. video, of a test driver may be analyzed to determine whether the test driver appears to be engaged in the task of monitoring the vehicle or whether the test driver has moved his or her head (or gaze) to a sufficient degree for some period of time. In some instances, the analysis may include looking for particular patterns that may suggest that the test driver is not engaged in the task of monitoring the vehicle. In addition, the "dwell time" or the amount of time that a test driver's head remains oriented in a particular direction may be assumed to correspond to an amount of time that the test driver spends looking at a particular object.

To determine whether the proportions would be expected, a model may be used. The model may be a machine learned model trained on good and bad examples of proportions of dwell times for different test drivers. In this regard, input into the model may include information such as the location of the vehicle, pre-stored map information, information from a perception system of the vehicle. The model may output a list of expected dwell times for objects which may be compared to the proportions discussed above. In some instances, rather than looking for a particular pattern or considering dwell time, another model may be used to determine a magnitude of the test driver's head movements or rather, how much a test driver's head moves over time.

The output of the model may be compared to a value to determine whether the test driver's head was moving sufficiently to suggest that the test driver is engaged in the task of monitoring the vehicle. Based on determination of whether the test driver appears to be engaged in the task of monitoring the vehicle, an intervention may be initiated.

The features described herein may provide for a reliable and effective system for identifying and responding to inattentive persons tasked with monitoring with monitoring the driving of a vehicle operating in an autonomous driving mode.

Example Systems

A driver monitoring system 100 may include one or more computing devices 110 having one or more processors 120 and memory 130 storing instructions 132 and data 134. The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing device 110 may include one or more sensors 170, such as LIDAR sensors, radar units, video cameras, etc., which may be configured to capture sensor data such as LIDAR data points, radar data points, video and/or still images of a test driver. The computing device 110 may also include a user output device 160, such as a display and/or speaker, as well as a user input device 150, such as a touchscreen, button(s), microphones, etc. in order to enable a driver to input information into the computing device 110 and/or communicate with a remote operator. Such features may be used to enable a remote operator to "check-in" on a driver as well as to enable two-way communications between the remote operator and the driver. In some instances, the output device and the user input device may be the same device (e.g. a touchscreen).

The driver monitoring system 100 may also include a communications system 140 that enables the driver monitoring system 100 to communicate with other computing devices such as the computing devices 210, 510, 520, 530, 540 or other systems of vehicle 200, such as deceleration system 260, acceleration system 262, steering system 264, signaling system 266, routing system 268, positioning system 270, and perception system 272 discussed in more detail below. For example, the communication system 140 may include wired and/or wireless connections (such as transmitters and receivers), that enable the driver monitoring system 100 to communicate with other computing devices. As an example, the communications system may enable the driver testing system to use various protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Figure 2:
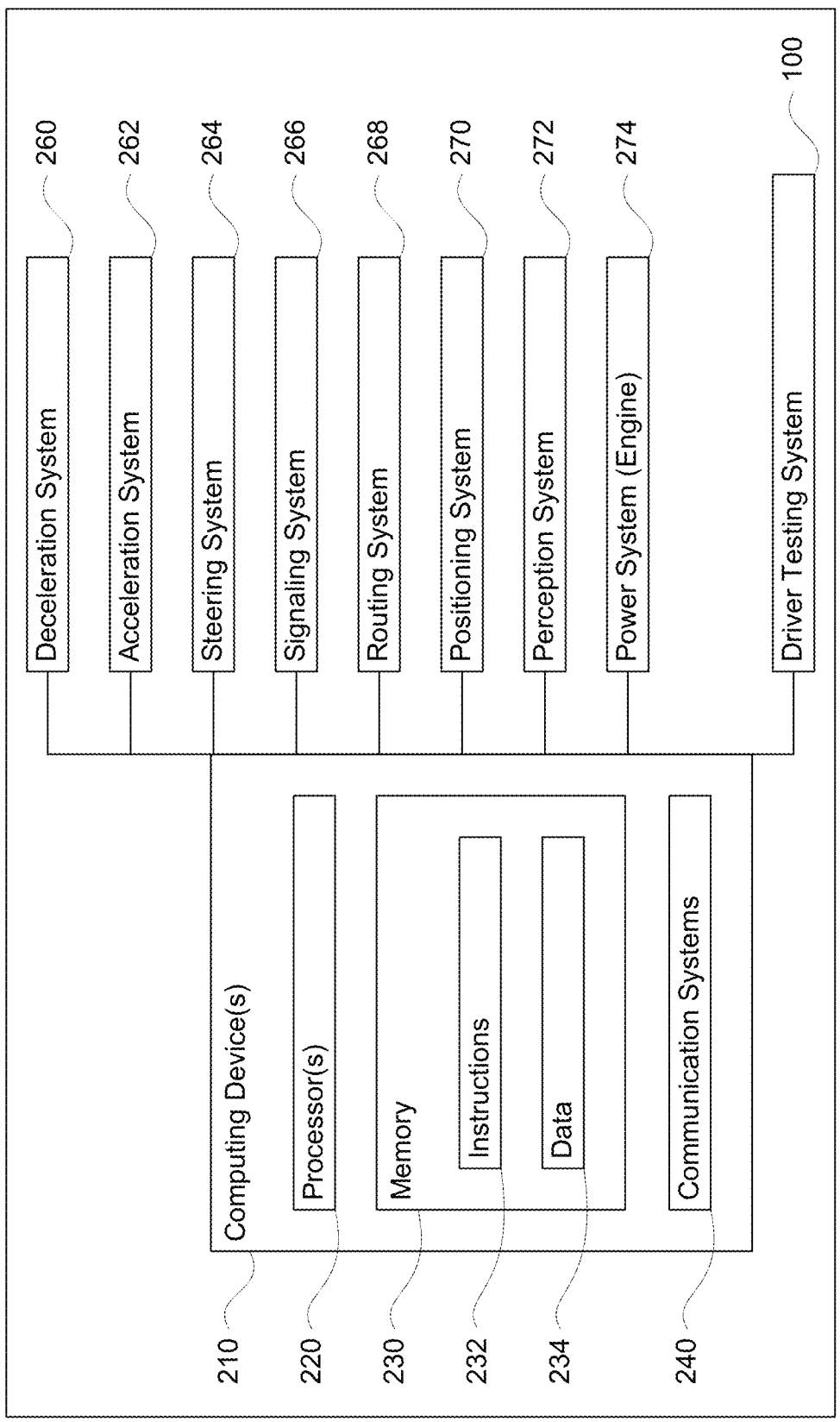
FIG. 2 is a functional diagram of an example vehicle in accordance with an exemplary embodiment.
Figure 4:
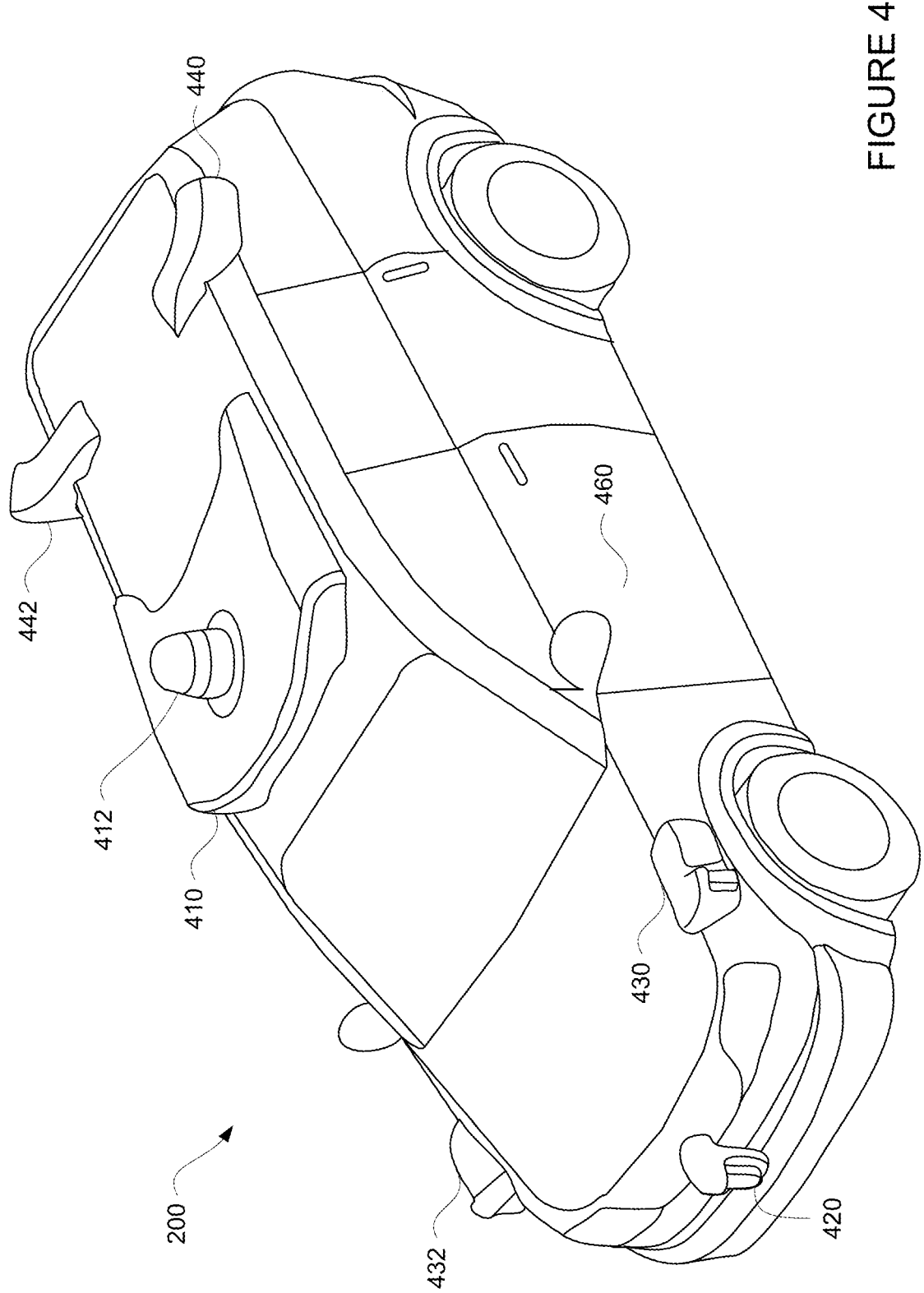
FIG. 4 is an example external view of a vehicle in accordance with aspects of the disclosure.

As noted above, the driver monitoring system 100 may be employed within a vehicle having an autonomous driving mode. FIG. 2 is an example block diagram of a vehicle 200, and FIG. 4 is an example view of the vehicle 200, In this example, the vehicle 200 is a vehicle having an autonomous driving mode as well as one or more additional driving modes, such as a semiautonomous or manual driving mode. While certain aspects of the disclosure are particularly useful in connection with specific types of vehicles, the vehicle may be any type of vehicle including, but not limited to, cars, trucks, motorcycles, buses, recreational vehicles, etc.

Turning to FIG. 2, the computing devices 110 of the driver monitoring system may be in communication with one or more computing devices 210 of the vehicle. As shown, the driver monitoring system may be incorporated into the vehicle 200 and may also be incorporated into the computing devices 210.

The one or more computing devices 210 may include one or more processors 220, memory 230 storing instructions 232 and data 234, and other components typically present in general purpose computing devices. These processors, memory, instructions and data may be configured the same or similarly to the processors 120, memory 130, instructions 132, and data 134.

In one aspect the computing devices 210 may be part of an autonomous control system capable of communicating with various components of the vehicle in order to control the vehicle in an autonomous driving mode. For example, returning to FIG. 2, the computing devices 210 may be in communication with various systems of vehicle 200, such as deceleration system 260, acceleration system 262, steering system 264, signaling system 266, routing system 268, positioning system 270, and perception system 272 in order to control the movement, speed, etc. of vehicle 200 in accordance with the instructions 232 of memory 230 in the autonomous driving mode.

As an example, computing devices 210 may interact with deceleration system 260 and acceleration system 262 in order to control the speed of the vehicle. Similarly, steering system 264 may be used by computing devices 210 in order to control the direction of vehicle 200. For example, if vehicle 200 is configured for use on a road, such as a car or truck, the steering system may include components to control the angle of wheels to turn the vehicle.

Routing system 268 may be used by computing devices 210 in order to determine and follow a route generated by a signaling system 266 to a location. For instance, the signaling system 266 may use map information to determine a route from a current location of the vehicle to a drop off location. The routing system 268 may periodically generate trajectories, or short-term plans for controlling the vehicle for some period of time into the future, in order to follow the route (a current route of the vehicle) to the destination. In this regard, the routing system 268, signaling system 266, and/or data 234 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 3:
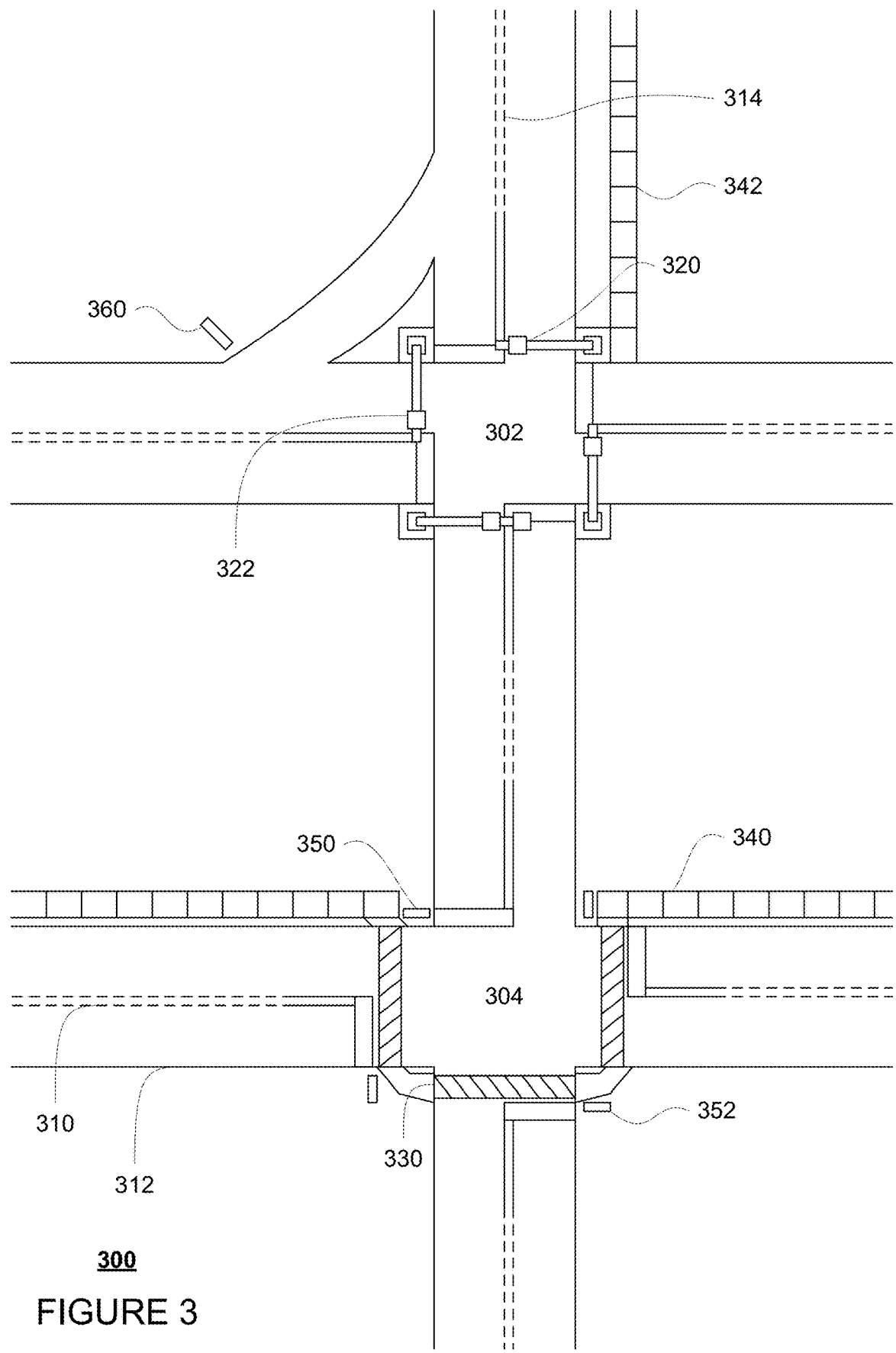
FIG. 3 is an example of map information in accordance with aspects of the disclosure.

FIG. 3 is an example of map information 300 for a section of roadway including intersections 302, 304. The map information 300 may be a local version of the map information stored in the memory 230 of the computing devices 210. In this example, the map information 300 includes information identifying the shape, location, and other characteristics of lane lines 310, 312, 314, traffic lights 320, 322, crosswalks 330, sidewalks 340, 342, stop signs 350, 352, and yield sign 360. In this regard, the map information includes the three-dimensional (3D) locations of traffic lights 320, 322 as well as information identifying the lanes which are controlled by these traffic lights.

While the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 270 may be used by computing devices 210 in order to determine the vehicle's relative or absolute position on a map or on the earth. For example, the positioning system 270 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 270 may also include other devices in communication with the computing devices of the computing devices 210, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 210, other computing devices and combinations of the foregoing.

The perception system 272 also includes one or more components for detecting objects external to the vehicle such as other vehicles, obstacles in the roadway, traffic signals, signs, trees, etc. For example, the perception system 272 may include lasers, sonar, radar, cameras and/or any other detection devices that record data which may be processed by the computing devices of the computing devices 210. In the case where the vehicle is a passenger vehicle such as a minivan, the minivan may include a laser or other sensors mounted on the roof or other convenient location.

For instance, FIG. 4 is an example external view of vehicle 200. In this example, roof-top housing 410 and dome housing 412 may include a LIDAR sensor as well as various cameras and radar units. In addition, housing 420 located at the front end of vehicle 200 and housings 430, 432 on the driver's and passenger's sides of the vehicle may each store a LIDAR sensor. For example, housing 430 is located in front of driver door 460. Vehicle 200 also includes housings 440, 442 for radar units and/or cameras also located on the roof of vehicle 200. Additional radar units and cameras (not shown) may be located at the front and rear ends of vehicle 200 and/or on other positions along the roof or roof-top housing 410.

The computing devices 210 may be capable of communicating with various components of the vehicle in order to control the movement of vehicle 200 according to primary vehicle control code of memory of the computing devices 210. For example, returning to FIG. 2, the computing devices 210 may include various computing devices in communication with various systems of vehicle 200, such as deceleration system 260, acceleration system 262, steering system 264, signaling system 266, routing system 268, positioning system 270, perception system 272, and power system 274 (i.e. the vehicle's engine or motor) in order to control the movement, speed, etc. of vehicle 200 in accordance with the instructions 232 of memory 230.

The various systems of the vehicle may function using autonomous vehicle control software in order to determine how to and to control the vehicle. As an example, a perception system software module of the perception system 272 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 272 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 270 identifying the location and orientation of the vehicle, a destination for the vehicle as well as feedback from various other systems of the vehicle may be input into a planning system software module of the routing system 268. The routing system 268 may use this input to generate trajectories for the vehicle to follow for some brief period of time into the future based on a current route of the vehicle generated by a routing module of the routing system 268. A control system software module of the computing devices 210 may be configured to control movement of the vehicle, for instance by controlling braking, acceleration and steering of the vehicle, in order to follow a trajectory.

Computing devices 210 may also include communication systems such as one or more wired or wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 210 may control the vehicle in an autonomous driving mode by controlling various components. For instance, by way of example, the computing devices 210 may navigate the vehicle to a destination location completely autonomously using data from the detailed map information and routing system 268. The computing devices 210 may use the positioning system 270 to determine the vehicle's location and perception system 272 to detect and respond to objects when needed to reach the location safely. Again, in order to do so, computing device 210 may generate trajectories and cause the vehicle to follow these trajectories, for instance, by causing the vehicle to accelerate (e.g., by supplying fuel or other energy to the engine or power system 274 by acceleration system 262), decelerate (e.g., by decreasing the fuel supplied to the engine or power system 274, changing gears, and/or by applying brakes by deceleration system 260), change direction (e.g., by turning the front or rear wheels of vehicle 200 by steering system 264), and signal such changes (e.g. by using turn signals). Thus, the acceleration system 262 and deceleration system 260 may be a part of a drivetrain that includes various components between an engine of the vehicle and the wheels of the vehicle. Again, by controlling these systems, computing devices 210 may also control the drivetrain of the vehicle in order to maneuver the vehicle autonomously.

The computing devices 210 may include a communications system 240 which may be the same or similar to communications system 140. The communications system may enable the computing devices 210 to communicate with other devices remote from the vehicle. In this way, information from the driver monitoring system 100 may be sent to remote devices. As such, the driver monitoring system may 100 be able to communicate with the computing devices 210 of the vehicle as well as various remote computing devices, such as those computing devices that are a part of the autonomous vehicle service as well as other computing devices, either directly or indirectly via the computing devices of the vehicle.

Figure 5:
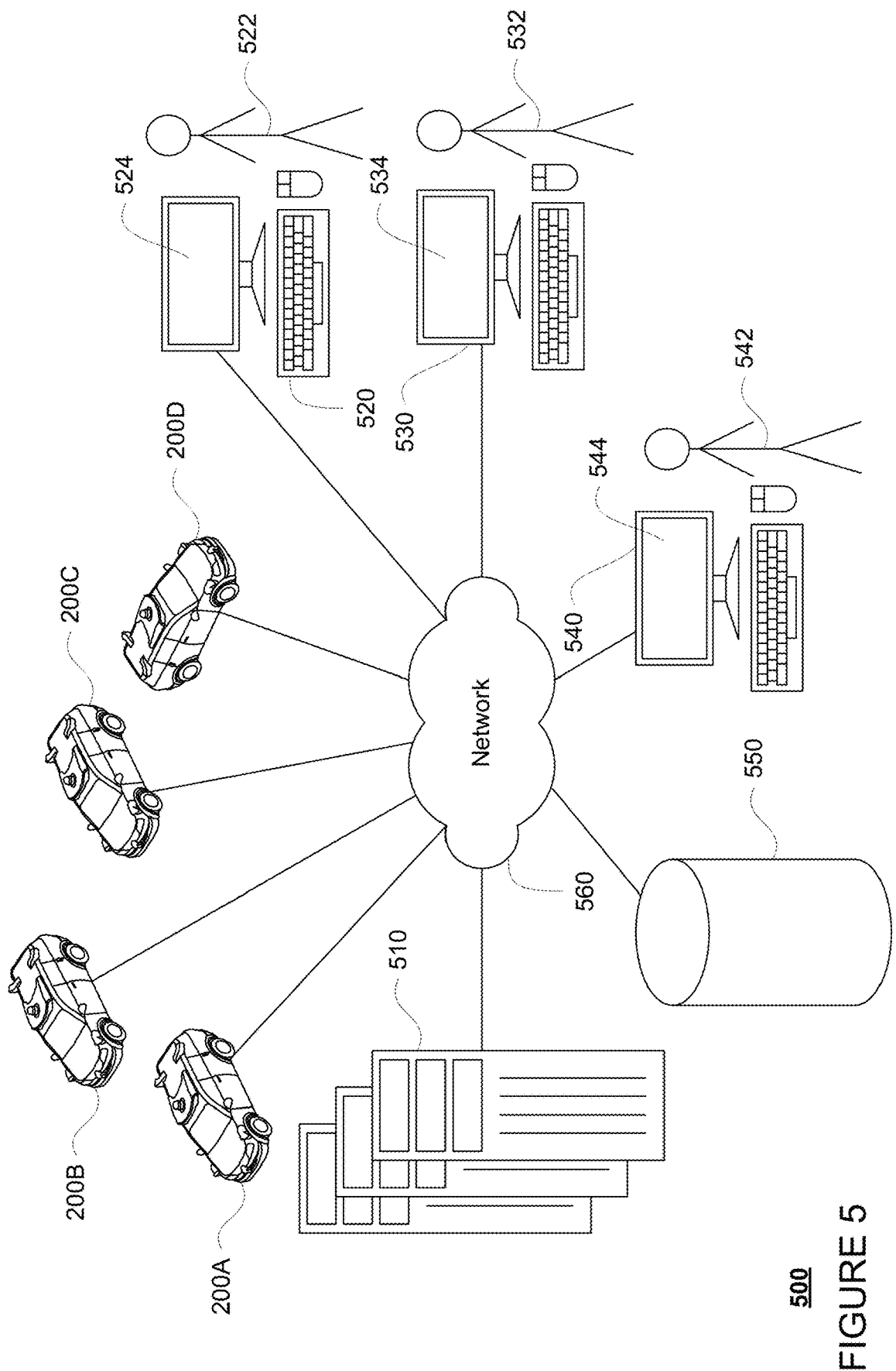
FIG. 5 is an example pictorial diagram of a system in accordance with aspects of the disclosure.
Figure 6:
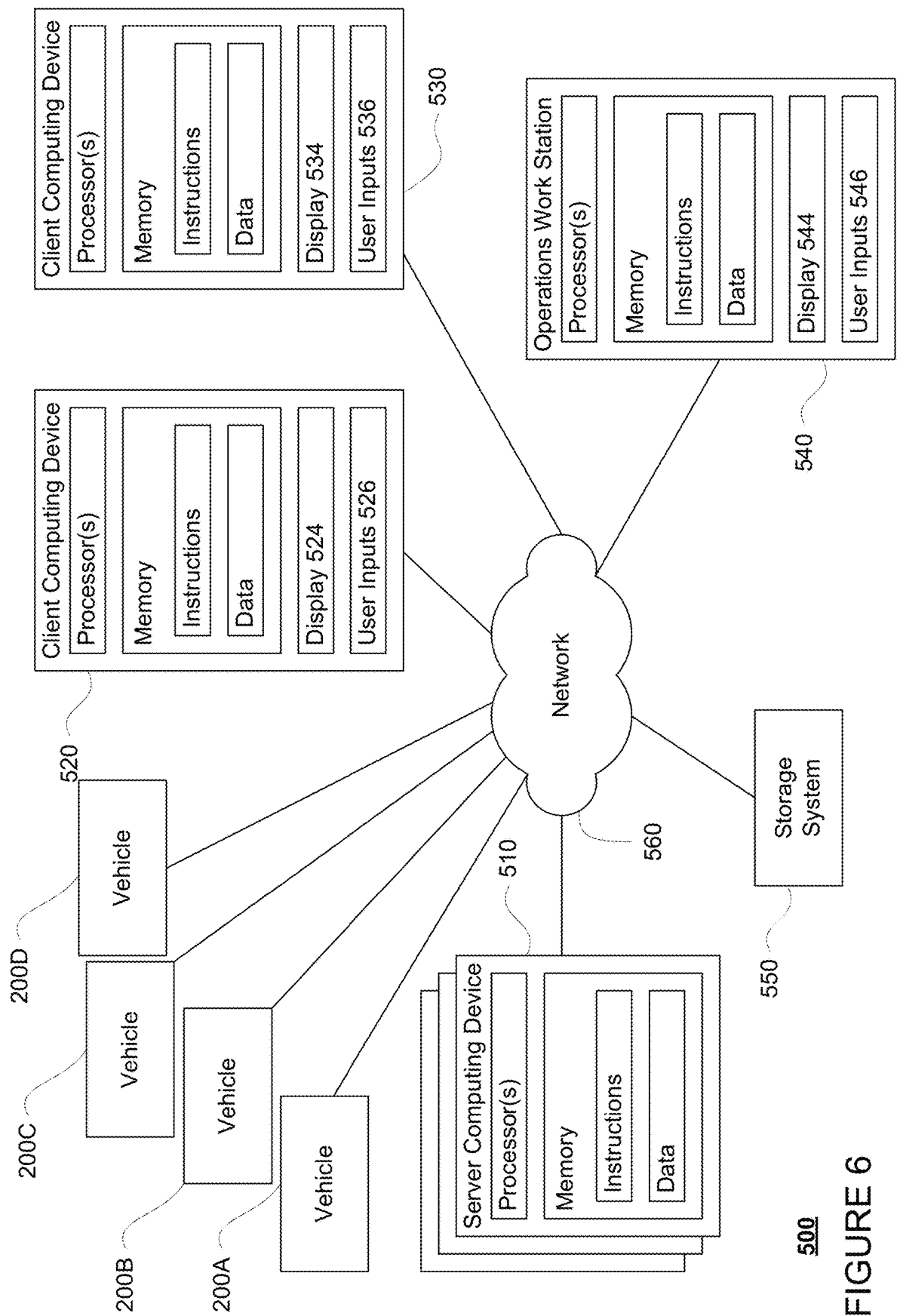
FIG. 6 is an example block diagram of the system of FIG. 5.

FIGS. 5 and 6 are pictorial and functional diagrams, respectively, of an example system 500 that includes a plurality of computing devices 510, 520, 530, 540 and a storage system 550 connected via a network 560. System 500 also includes vehicles 200A, 200B, 200C, 200D, which may be configured the same as or similarly to vehicle 200. Although only a few vehicles and computing devices are depicted for simplicity, a typical system may include significantly more.

As shown in FIG. 5, each of computing devices 510, 520, 530, 540 may include one or more processors, memory, data and instructions. Such processors, memories, data and instructions may be configured similarly to one or more processors 120, memory 130, data 134, and instructions 132 of computing device 110.

The network 560, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Again, communication may be facilitated by any device capable of transmitting data to and from other computing devices, such as modems and wireless interfaces.

In one example, one or more computing devices 510 may include one or more server computing devices having a plurality of computing devices, e.g., a load balanced server farm, that exchange information with different nodes of a network for the purpose of receiving, processing and transmitting the data to and from other computing devices. For instance, one or more computing devices 510 may include one or more server computing devices that are capable of communicating with computing device 210 of vehicle 200 or a similar computing device of other vehicles as well as computing devices 520, 530, 540 via the network 560. For example, each of the vehicles 200A, 200B, 200C, 200D, may correspond to vehicle 200 and may be a part of a fleet of vehicles of the autonomous vehicle service that can be dispatched by server computing devices 510 to various locations. In this regard, the server computing devices 510 may function (in conjunction with storage system 550) as a dispatching system for the autonomous vehicle service which can be used to dispatch vehicles such as vehicle 200 and vehicle 200A to different locations in order to pick up and drop off passengers. In addition, server computing devices 510 may use network 560 to transmit and present information to a person, such as human operators 522, 532, 542 on a display, such as displays 524, 534, 544 of computing devices 520, 530, 540. In this regard, computing devices 520, 530, 540 may be considered client computing devices.

As shown in FIG. 6, each client computing device 520, 530, 540 may be a personal computing device intended for use by a human operator 522, 532, 542, and have all of the components normally used in connection with a personal computing device including a one or more processors (e.g., a central processing unit (CPU)), memory (e.g., RAM and internal hard drives) storing data and instructions, a display such as displays 524, 534, 544 (e.g., a monitor having a screen, a touch-screen, a projector, a television, or other device that is operable to display information), and user input devices 526, 536, 546 (e.g., a mouse, keyboard, touchscreen or microphone). The client computing devices may also include a camera for recording video streams, speakers, a network interface device, and all of the components used for connecting these elements to one another.

Although the client computing devices 520, 530, and 540 may each comprise a full-sized personal computing device, they may alternatively comprise mobile computing devices capable of wirelessly exchanging data with a server over a network such as the Internet. By way of example only, the client computing devices may include a mobile phone or a device such as a wireless-enabled PDA, a tablet PC, a wearable computing device or system, or a netbook that is capable of obtaining information via the Internet or other networks.

Each of the client computing devices may be remote monitoring work station used by a person (e.g. human operators 522, 532, 542) to provide concierge or remote assistance services to test drivers of vehicles 200A, 200B, 200C, 200D. For example, a human operator 542 may use the remote monitoring workstation 540 to communicate via a telephone call or audio connection with people through their respective client computing devices or vehicles 200A, 200B, 200C, 200D, in order to ensure the safe operation of these vehicles and the safety of the test drivers as described in further detail below. Although only a few remote monitoring workstations are shown in FIGS. 5 and 6, any number of such work stations may be included in a typical system.

As with memory 130, storage system 550 can be of any type of computerized storage capable of storing information accessible by the server computing devices 510, such as a hard-drive, memory card, ROM, RAM, DVD, CD-ROM, write-capable, and read-only memories. In addition, storage system 550 may include a distributed storage system where data is stored on a plurality of different storage devices which may be physically located at the same or different geographic locations. Storage system 550 may be connected to the computing devices via the network 560 as shown in FIGS. 5 and 6, and/or may be directly connected to or incorporated into any of the computing devices 510, 520, 530, 540, etc.

The storage system 550 may be configured to store various information including videos, driver drowsiness values, radio button selections, thresholds, test driver information, human operator information, reliability scores for human operators, intervention or fatigue event information, models, model data (e.g. parameters), etc. as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 9:
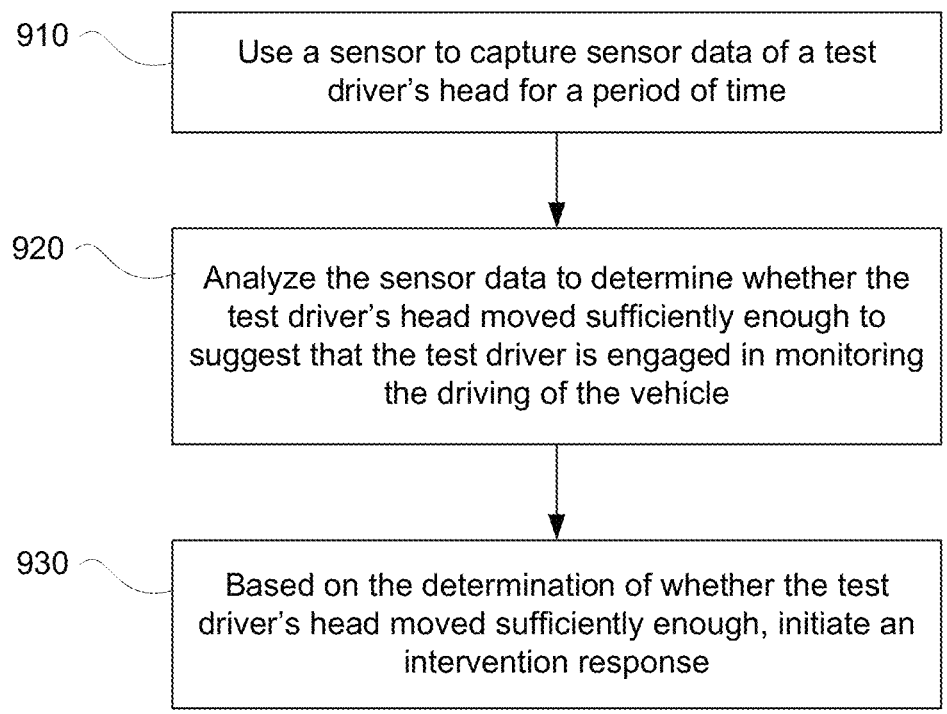
FIG. 9 is an example flow diagram in accordance with aspects of the disclosure.

FIG. 9 is an example flow diagram 900 for analyzing head movements in a test driver tasked with monitoring the driving of a vehicle operating in an autonomous driving mode. The blocks of FIG. 9 may be performed by one or more processors of one or more computing devices, such as processors 120 of computing devices 110 of the driver monitoring system 100. For instance, at block 910, a sensor is used to capture sensor data of a test driver's head for a period of time.

The movements of a test driver's head may be captured using a sensor mounted within the vehicle and oriented towards where the test driver is sitting. For instance, these persons tasked with monitoring vehicles driving in an autonomous driving mode (hereafter, test drivers) may be monitored via the one or more sensors 170. These sensors may be mounted overhead and/or in front of the test driver within the vehicle in order to best monitor the condition of the test or safety driver. For example, FIG. 7A, depicts a pair of videos 710, 720 (or rather, video feeds) from the one or more sensors 170 (here, video cameras) of any of vehicles 200A, 200B, 200C, 200D. Video 710 may be from a camera mounted at a headliner of a vehicle and/or proximate to a rear-view mirror of the vehicle and oriented towards driver 730. Video 720 may be from a camera mounted at a headliner above and oriented downwards towards the driver 730.

In some instances, gaze detection technology may also be used; however, detecting the change in head position (e.g. by determining an orientation of a vector originating from a point on or within a person's head) may be much simpler than detecting a gaze direction. In some instances, gaze may be used when possible, but the driver monitoring system may fall back to head orientation when gaze is unable to be determined such as when light washes out the pupil and gaze can't be determined. In this regard, relying on head movements, as opposed to gaze, may avoid issues that may arise due to change in lighting, the size of a test driver's pupils, whether a test driver is wearing sunglasses, etc. In some instances, the sensor may include a typical video camera which can function in low lighting conditions with the use of infrared illumination (e.g. night vision). In addition or alternatively, the sensor may include radar and ultrasonic devices which can detect movement by changes in positions.

Returning to FIG. 9 at block 920, the sensor data may be analyzed to determine whether the test driver's head moved sufficiently enough to suggest that the test driver is engaged in monitoring the driving of the vehicle. The sensor data or the video of a test driver may be analyzed to determine whether the test driver appears to be engaged in the task of monitoring the vehicle or whether the test driver has moved his or her head vector to a sufficient degree for some period of time. This period of time may be a sliding window of 30 seconds, 45 seconds, 1 minute or more or less every 10 seconds or more or less.

Analyzing the sensor data or the video may include using known approaches for detecting the vector of a test driver's head (e.g. head vector). The head vector may also correspond to a particular field of view or range of angles that the test driver is expected to be able to observe. Thus, to look at "observe" an object, the object needs only be within the range of angles for a particular vector. Failure to do so within the period of time may suggest that the test driver is not engaged. For instance, turning to the example of FIG. 7B, the head 740 of test driver 730 is oriented in the direction of arrow 742. However, when oriented in this direction, the test driver may actually be assumed to observe any objects within a certain distance which are within a range of angles corresponding to the field of view of angle ⊖. Depending upon the sensitivity of the driver monitoring system, angle ⊖ can be selected to be wider (for more tolerant approaches) or narrower (for less tolerant approaches).

In some instances, the position and head vector as well as changes in position and head vector can be determined using a simple model of head position relative to an expected position of the test driver's body. More complex models, such as those utilizing neural networks and machine learning may also be trained using video or still images of persons with their heads in different orientations and positions. By estimating this change in the position of the test driver's head vector, this may be a reasonable proxy for determining at "what" the test driver is looking as in most cases a person's head vector is oriented towards the direction of his or her eyes.

In some instances, the analysis may include looking for particular patterns that may suggest that the test driver is not engaged in the task of monitoring the vehicle. For instance, one pattern may include keeping the driver's eyes or rather the orientation vector above a certain orientation for at least some portion of the time. For example, if a test driver's head vector is oriented below the level of the dashboard for more than a few seconds at a time or for a percentage of the time, this may suggest that the test driver is not engaged. As another instance, a test driver may be expected to check the mirrors (e.g. move their head or gaze towards the left, right and rearview mirrors) every so often and thus, the head vector should be oriented towards the mirrors (or the range of angles should cover the location of the mirrors) every so often. Failure to do so within the period of time may suggest that the test driver is not engaged.

In some instances, looking for particular patterns may also be based on pre-stored map information, such as the map information 300, about the area in which the vehicle is currently driving. For example, if there is a traffic light or stop sign in the environment which the vehicle must obey, the test driver should, at some point during the period of time, orient his or her head vector in the direction of the traffic light or stop sign. Alternatively, rather than relying on map information, the context in which a vehicle is driving may be determined by information from the vehicle's perception system 272 in real time.

As another instance, patterns may also be based whether the vehicle is in motion or when the vehicle is about to begin moving. For example, a test driver may not need to look at the road or above a dashboard the entire period of time when the vehicle is stopped. However, once the vehicle is expected to begin moving (e.g. when a light is about to turn green), the magnitude and number of head movements may be expected to increase dramatically. Of course, for more tired drivers, this may not be the case. In this regard, failure to change his or her head vector while the vehicle is getting ready to move or beginning to move, may suggest that the test driver is not engaged.

In some instances, looking for particular patterns may also be based on contextual information about the area in which the vehicle is currently driving. For instance, a test driver may be expected to look in an area next to the vehicle to check for another vehicle in a "blind spot" area, look at another vehicle actively changing lanes, look at certain types of road users (e.g. vulnerable road users such as pedestrians and bicyclists, more unpredictable road users such as small animals, children, bicyclists, persons jaywalking, certain types of vehicles such as busses, police or other emergency vehicles, etc.), objects within a certain distance of the vehicle (e.g. if a pedestrian is within 10 feet of the vehicle, it is more important that the test driver look at that pedestrian than one that is 50 feet from the vehicle).

For the purposes of demonstration, FIG. 8 depicts vehicle 200 being maneuvered on a section of roadway 800 including intersections 802, 804. In example of FIG. 8, intersections 802 and 804 correspond to intersections 302 and 304 of the map information 300, respectively. In this example, lane lines 810, 812, 814 correspond to the shape, location, and other characteristics of lane lines 310, 312, 314, respectively. Similarly, crosswalk 830 corresponds to the shape, location, and other characteristics of crosswalk 330, respectively; sidewalks 840, 842 correspond to sidewalks 340, 342; traffic lights 820, 822 correspond to traffic lights 320, 322, respectively; stop signs 850, 852 correspond to stop signs 350, 352, respectively; and yield sign 860 corresponds to yield sign 360. In this example, vehicle 200 is entering intersection 804 and approaching intersection 802. The perception system 272 may detect and identify various objects in the vehicle's environment including those features identified above which correspond to features of the map information as well as other objects such as other road users including vehicle 870, bicyclist 872, and pedestrian 874.

In this example, for a given period of time immediately before, after or including the point of time of the example of FIG. 8, the test driver of vehicle 200 may be expected to turn his or her head (or rather head vector) in the direction of vehicle 870, bicyclist 872, and/or pedestrian 874 at some point in time before vehicle 200 passes these other road users. In addition or alternatively, the test driver may be expected to turn his or hea head towards the stop sign 850 (though at some point before the point in time of the example of FIG. 8) as well as the traffic light 820.

In addition, the "dwell time" or the amount of time that a test driver's head vector remains oriented in a particular direction may be assumed to correspond to an amount of time that the test driver spends looking at a particular object (e.g. the object is within the range of angles as noted above). This dwell time may be at least some threshold. For example, to actually fully perceive an object, the object may need to have been within the range of angles for at least some threshold amount of time such as 0.1 second, 100 milliseconds or more or less. In this regard, analyzing the video may include identifying a list of objects and dwell times for those objects during the period of time as described above. In other words, the videos 710, 720 may be analyzed to determine the amounts of time for which the test driver would have observed any of vehicle 870, bicyclist 872, pedestrian 874, stop sign 850, and the traffic light 820 according to the head movements of the test driver over some period of time. Example amounts of time may include 2 seconds, 4 seconds, 10 seconds, 10 seconds, 12 seconds, respectively. These amounts of times (or fractions of the period of time) may be considered "proportions" of the period of time.

These proportions or amounts of time may be compared with expected amounts of time. If these proportions are inconsistent with what would be expected, this may indicate that the test driver is not engaged. In this regard, proportions may be considered inconsistent when the proportions are different from an expected outcome according to road rules (where expected outcome can be well defined), different from other drivers in the same or similar situations (specifically from alert drivers where alertness is measured as fatigue score), are similar to fatigued drivers, or simply are different from a given test driver's usual behavior. What is expected to be observed can be thought of as the most common or typical behavior as alert driving may be more common than fatigued driving. In this regard, with enough data to define the typical head orientation pattern for a given context, such proportions can be determined.

Examples of different from an expected outcome may include, for example: when passing road signs test drivers may be expected to orient his or her head vector towards those road signs, at an uncontrolled intersection (no lights, no stop signs) or at a 2 or four way stop a test driver may be expected to orient his or her head vector and watch for vehicles on the left and on the right, when passing debris on the road a test driver may be expected to orient his or her head vector towards the debris, when changing lanes or merging in traffic a test driver may be expected to quickly his or her head vector over his or her shoulder, when other vehicles are changing lanes a test driver may be expected to orient his or her head vector towards those other vehicles, when pedestrians are crossing a test driver may be expected to orient his or her head vector in the direction of those pedestrians, etc.

Examples of different from other driver's head movement may include if other test drivers orient his or her head vector in a particular pattern passing a specific area, but one driver does not, this may suggest that the one driver is not attentive. In addition to "lack of head movement" where a given driver does not move their head where other drivers do, inconsistency may correspond to different amounts of head movements, either resulting in shorter period of time or smaller angle of the move as compared to alert driver population. Further, in addition to watching driver head vectors in a particular place, total amount of head movement (e.g. change in head vector overtime) may be compared over a period of time, such as 15 min, 1 hour, an entire shift of a test driver, etc., may be compared to that of other drivers. In this example, a lower amount of head movement over a longer period of time, may suggest that the test driver is not engaged.

Examples of different from a given test driver's usual performance may include comparing the given test driver's head vector or change in head vector at a given location or on a given date/time to their historical behavior at that location or similar date/time. Significant deviations from the average may suggest that the test driver is not engaged.

To determine whether the proportions would be expected, a model may be used. The model may be a machine learned model trained on good and bad examples of proportions of dwell times for different test drivers. In this regard, input into the model may include the period of time or rather the sliding window of the video, head vectors, dwell times, and/or proportions as well as information such as the location of the vehicle, pre-stored map information, information from a perception system of the vehicle (what objects have been detected and where are they located). The model may output a list of expected dwell times for objects which may be compared to the proportions discussed above. Positive examples (e.g. those that suggest that the test driver is engaged) may be generated for training, for instance, by recording videos of test drivers while purposefully following motor vehicle laws and guidelines precisely during most frequent maneuvers such as crossings, watching pedestrians, changing lanes, watching debris on road etc. Negative examples (e.g. those that suggest that the test driver is not engaged) for training may be generated, for instance, by utilizing videos from test drivers immediately before a fatigue event or intervention (discussed further below) and/ or may be defined by traffic law violations, near misses, passenger-reported driving discomfort, or even (and this is a stretch) the detection of increased caution in other road users (other cars, pedestrians, bikes, etc.). In some instances, the model may also use other information such as sounds captured by microphones, ambient light levels, etc. or even information specific to the test driver such as the point in the test driver's shift (beginning, middle, end, etc.) as input.

In other instances, the model may be used to process the period of time or rather the sliding window of the video, head vectors, dwell times, and/or proportions and provide an output value. For example, the model may be trained to provide a value on a scale of 0 to 1 which indicates how closely a test driver's head movements correspond to expected head movements for a test driver in a similar situation. The output of the model may be compared to a threshold value to determine whether the test driver's head was observing enough objects for enough time in order to suggest that the test driver is engaged in the task of monitoring the vehicle.

In some instances, rather than looking for a particular pattern or considering dwell time, another model may be used to determine a magnitude of the test driver's head movements or rather, how much a test driver's head moves over time. For instance, the model may be a machine learned model trained using the aforementioned sliding windows of videos for the period of time. Again, the period of time may be 30 seconds, 45 seconds, 1 minute or more or less and may be selected or tuned in order to provide the most useful outputs from the model. The model may output a head movement score on an arbitrary scale, such as 0 to 1 where 0 is no head movement and 1 is essentially constant head shaking. Before training, some of the data could be filtered for test drivers who had fatigue events or who may have had irregular movements (e.g. a seizure, an accident, etc.). Head movement can be understood as a combination of acceleration changes frequency and the distance covered by the head vector's azimuth plane over time. As such, a head with more frequent changes in acceleration which covers more azimuth distance would be determined to have more movement than a head with lower distance or acceleration change frequency.

In some instances, in order to collect early evidence that a test driver may be fatigued based on the magnitude of their head movements, the route of the vehicle may be modified in a way that would stimulate more head movement in an alert driver to further test the hypothesis. This may include selecting a route which passes more intersections or other types of crossings, doing more turns, changing more lanes, etc.

In some instances, additional inputs into the model may include ambient light levels. To do so, head movement patterns at different light levels may be observed in order to provide a reference point for each interval of ambient light level. In some instances, with less ambient light, more driver head movement would be expected. Though the reverse may also be true.

The output of the model may be compared to a value to determine whether the test driver's head was moving sufficiently to suggest that the test driver is engaged in the task of monitoring the vehicle. This value may be hand-tuned threshold value in order to provide a sufficiently acceptable level of recall and to ensure that test drivers are adequately evaluated. Alternatively, the value may be an idealized value for the amount of head movement of a test driver. If the test driver's head movement value is outside of some threshold of the value (e.g. much too low or even much too high, this may suggest that the test driver in not engaged.

As another alternative, the value may also be determined based on the history of a particular test driver. For instance, a first test driver may have much greater head movements than a second test driver. In this regard, the first driver may be expected to have higher head movement scores on average than the second test driver. To address this, each test driver's head movement score may be adjusted based on their past history of scores. In this regard, the first test driver's score may be adjusted downwards, and the second test driver's score may be adjusted upwards. Alternatively, rather than adjusting the head movement scores, the value may be adjusted. In this regard, the value may be adjusted upward for the first test driver and downwards for the second test driver.

In addition or as an alternative to using the aforementioned value, head movement scores of a test driver over time may be analyzed. This may identify situations in which a test driver's head movements slow down over time. In this regard, if the amount of a decrease in head movements is greater than some value, this may indicate that may suggest that the test driver is not engaged (or becoming not engaged). For example, if over the last 5 minutes, the slope of scores for a test driver drops off at a predetermined rate (e.g. more than 10 percent), this may suggest that the test driver is not engaged.

Returning to FIG. 9 at block 930, based on determination of whether the test driver appears to be engaged in the task of monitoring the vehicle, an intervention may be initiated. This may involve the driver monitoring system 100 sending a signal to any of computing devices 210, 510, 520, 530, 540, etc. in order to cause the vehicle itself and/or a remote computing device to initiate an intervention response. In some instances, an in initial intervention response may simply include the driver monitoring system 100 giving the driver an audible notification via the user output devices 160 to engage his or her attention in monitoring the vehicle. In some instances, this notification may include more specific information, such as a request to the test driver to exhibit special attention when changing lanes or crossing roads— depending on observed response to this recommendation further escalated actions may include.

Other intervention responses may include providing supportive options and, if applicable, task-reassignment. Examples of intervention options may include increasing the frequency with which a test driver is monitored, automatically causing the vehicle to pull over, routing the vehicle to a different driving area and/or limiting a maximum speed of the vehicle, returning the vehicle to a depot (so that the test driver can take a break or simply stop monitoring vehicles for the day), etc. As one example, an intervention may include causing the vehicle to automatically pull over, whereby the vehicle is prevented from resuming operation in the autonomous driving mode until the test driver is determined to be sufficiently alert. When this is the case could be determined by an automated system or a remote assistance operator's judgement. As an example, an automated system could require a break period proportional to the level of prior engagement, an alertness test to be taken, or restrict the driver to manual operation for a period of time.

In addition or alternatively, other intervention responses may include providing the test driver with a set of tasks to get the driver more engaged or further evaluate fatigue or distractedness, connecting the test driver (or rather, the vehicle) with a remote assistance operator who can interact with the test driver, or even relieving the test driver of the duty of monitoring a vehicle for a current shift (e.g. asked to return to a depot or have the vehicle pulled over to wait for another test driver or operator to assist the test driver). In addition, task reassignment may include, for example, controlling the vehicle in a manual driving rather than monitoring the vehicle while the vehicle operates in an autonomous driving mode, ending the test driver's shift, etc. as noted above.

In some instances, the intervention responses may include creating or engaging in interactivity between the driver monitoring system or another system of the vehicle and the test driver in inverse proportion to the observed deficit in engagement. For example, such a system may prompt the driver to verbally or behaviorally interact in a way that improves alertness and task engagement. The system may cease to provide the supplementary engagement intervention when task engagement returns to normative levels or when engagement begins to slope positively.

The features described herein may provide for a reliable and effective system for identifying and responding to inattentive persons tasked with monitoring the driving of a vehicle operating in an autonomous driving mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for analyzing head movements in a test driver tasked with monitoring driving of a vehicle operating in an autonomous driving mode, the method comprising:
   using, by one or more processors, a sensor to capture sensor data of a test driver's head for a period of time;
   analyzing, by the one or more processors, the sensor data to determine whether movement of the test driver's head meets at least one criterion indicative of the test driver being inattentive in monitoring the driving of the vehicle; and
   responsive to determining that the movement of the test driver's head has met the at least one criterion, generating, by the one or more processors, an intervention response that controls the vehicle.

2. The method of claim 1, wherein the sensor is a camera, and the sensor data is a video captured over the period of time.

3. The method of claim 2, wherein analyzing the sensor data includes using a model to determine changes in position of the test driver's head, and wherein the determination of whether the movement of the test driver's head has met the at least one criterion is further based on the changes in position of the test driver's head.

4. The method of claim 1, wherein analyzing the sensor data includes looking for a particular pattern of movement, and wherein the determination of whether the movement of the test driver's head has met the at least one criterion is further based on the particular pattern of movement.

5. The method of claim 4, wherein the particular pattern of movement includes whether an expected head vector of the test driver is oriented above a dashboard of the vehicle for a portion of the period of time.

6. The method of claim 4, wherein the particular pattern of movement includes whether an expected head vector of the test driver is oriented below a dashboard of the vehicle for at least a given amount of time.

7. The method of claim 4, wherein the particular pattern of movement includes whether a head vector of the test driver was oriented towards one or more mirrors of the vehicle within the period of time.

8. The method of claim 1, further comprising, receiving information about an object detected in an environment of the vehicle by a perception system of the vehicle, and wherein analyzing the sensor data includes determining an amount of time that the test driver observed the object such that the determination of whether the movement of the test driver's head has met the at least one criterion is further based on the amount of time.

9. The method of claim 1, further comprising, receiving information about a plurality of objects detected in an environment of the vehicle by a perception system of the vehicle, and wherein analyzing the sensor data includes determining an amount of time that the test driver observed each of the plurality of objects such that the determination of whether the movement of the test driver's head has met the at least one criterion is further based on the amounts of time for each of the plurality of objects.

10. The method of claim 9, further comprising:
comparing the amounts of time for each of the plurality of objects with expected amounts of time, wherein the determination of whether the movement of the test driver's head has met the at least one criterion is further based on the comparison; and
using a model to determine the expected amounts of time based on a location of the vehicle when the sensor data was captured, pre-stored map information used to control the vehicle, and the received information.

11. The method of claim 1, further comprising, receiving information about a plurality of objects detected in an environment of the vehicle by a perception system of the vehicle, and wherein:
analyzing the sensor data includes inputting the received information, the sensor data, pre-stored map information used to control the vehicle, and a location of the vehicle when the sensor data was captured into a model in order to determine a value indicative of how closely a test driver's head movements correspond to expected head movements for a test driver, and
the determination of whether the movement of the test driver's head has met the at least one criterion is further based on the value.

12. The method of claim 1, wherein analyzing the sensor data includes inputting the sensor data into a model in order to determine a head movement score for the sensor data, the head movement score corresponds to a magnitude of head movements of the test driver during the period of time, the method further comprises comparing the head movement score to a value, and the determination of whether the movement of the test driver's head has met the at least one criterion is further based on the comparison.

13. The method of claim 12, further comprising determining the value based on past history of head movement scores for the test driver.

14. The method of claim 1, wherein analyzing the sensor data includes inputting the sensor data into a model in order to determine a head movement score for the sensor data, the head movement score corresponds to a magnitude of the head movements of the test driver during the period of time, and the method further comprises analyzing changes in head movement scores including the head movement score over time, and the determination of whether the movement of the test driver's head has met the at least one criterion is further based on the changes.

15. The method of claim 1, wherein analyzing the sensor data includes determining whether the movement of the test driver's head is less than a threshold, wherein the movement being less than the threshold corresponds to the test driver being inattentive in monitoring the driving of the vehicle.

16. The method of claim 1, wherein generating the intervention response includes increasing a frequency of capturing the sensor data.

17. The method of claim 1, wherein generating the intervention response includes causing the vehicle to pull over.

18. The method of claim 1, wherein generating the intervention response includes routing the vehicle to a driving area.

19. The method of claim 1, wherein generating the intervention response includes limiting a maximum speed of the vehicle.

20. The method of claim 1, wherein generating the intervention response includes returning the vehicle to a depot.

* * * * *